March 18, 1952 R. CRANE, JR., ET AL 2,589,927

KEYED AUTOMATIC GAIN CONTROL AND SYNC SEPARATOR

Filed Feb. 25, 1949 3 Sheets-Sheet 1

Inventors
ROBERT CRANE, JR.
LOUIS L. POURCIAU

By H. L. Mackey
Attorney

March 18, 1952 R. CRANE, JR., ET AL 2,589,927

KEYED AUTOMATIC GAIN CONTROL AND SYNC SEPARATOR

Filed Feb. 25, 1949 3 Sheets-Sheet 2

Inventors
ROBERT CRANE, JR.
LOUIS L. POURCIAU

By H. L. Mackey
Attorney

March 18, 1952 R. CRANE, JR., ET AL 2,589,927

KEYED AUTOMATIC GAIN CONTROL AND SYNC SEPARATOR

Filed Feb. 25, 1949 3 Sheets-Sheet 3

Inventors
ROBERT CRANE, JR.
LOUIS L. POURCIAU

By H. L. Mackey
Attorney

Patented Mar. 18, 1952 2,589,927

UNITED STATES PATENT OFFICE 2,589,927

KEYED AUTOMATIC GAIN CONTROL AND SYNC SEPARATOR

Robert Crane, Jr., Chappaqua, and Louis L. Pourciau, Pleasantville, N. Y., assignors to General Precision Laboratory Incorporated, a corporation of New York Application February 25, 1949, Serial No. 78,434

14 Claims. (Cl. 178—7.5)

This invention relates to a television receiver wherein the gain of the receiver is automatically varied in accordance with the signal level of a selected portion of the composite video-synchronizing transmitted signal.

More specifically, the black level of the horizontal blanking signal is intermittently selected and utilized as a reference voltage to regulate and determine the potential to be applied to the gain control electrodes of the amplifier stages of the receiver. By this arrangement any variation in the black level voltage, either between the signals from different transmitters or variation in this level by a single transmitter, will automatically vary the gain of the receiver in such a compensatory direction that the output voltage representative of the black level voltage as applied to the cathode ray tube of the receiver is constant and equal to the beam current cut-off of the tube.

Thus, the instant invention eliminates changes in picture brightness and contrast when switching from station to station and further avoids such changes in picture brightness during the course of receiving a program from a single station whether due to change of received signal strength or variation from constant black level of the transmitter. The instant invention, therefore, makes frequent readjustment of both brightness and contrast unnecessary.

At the same time the circuit elements which cooperate to produce the automatic gain control with its obvious advantages of simplified operation, also provide complete separation of the picture and synchronizing signals so that each may be used for its intended function without possibility of interference or contravention of one with the other.

Such a complete and clean separation avoids overlapping of line due to lack of interlace and what is commonly known as tearing of the horizontal strip, that is, a jumping or momentary misplacement of a horizontal portion of the complete picture.

The instant invention has for its essential purposes, therefore, the provision of a circuit which has a constant black level reference regardless of changes in the black level of the received signal.

Additionally, the present invention provides clean and complete separation of synchronizing signals from the video signals thereby providing clear, accurate pictures of constant black level tone and undistorted sweep synchronization.

The exact nature of the invention will be more clearly apparent from the following detailed description when taken together with the attached drawings, in which.

Figure 1:
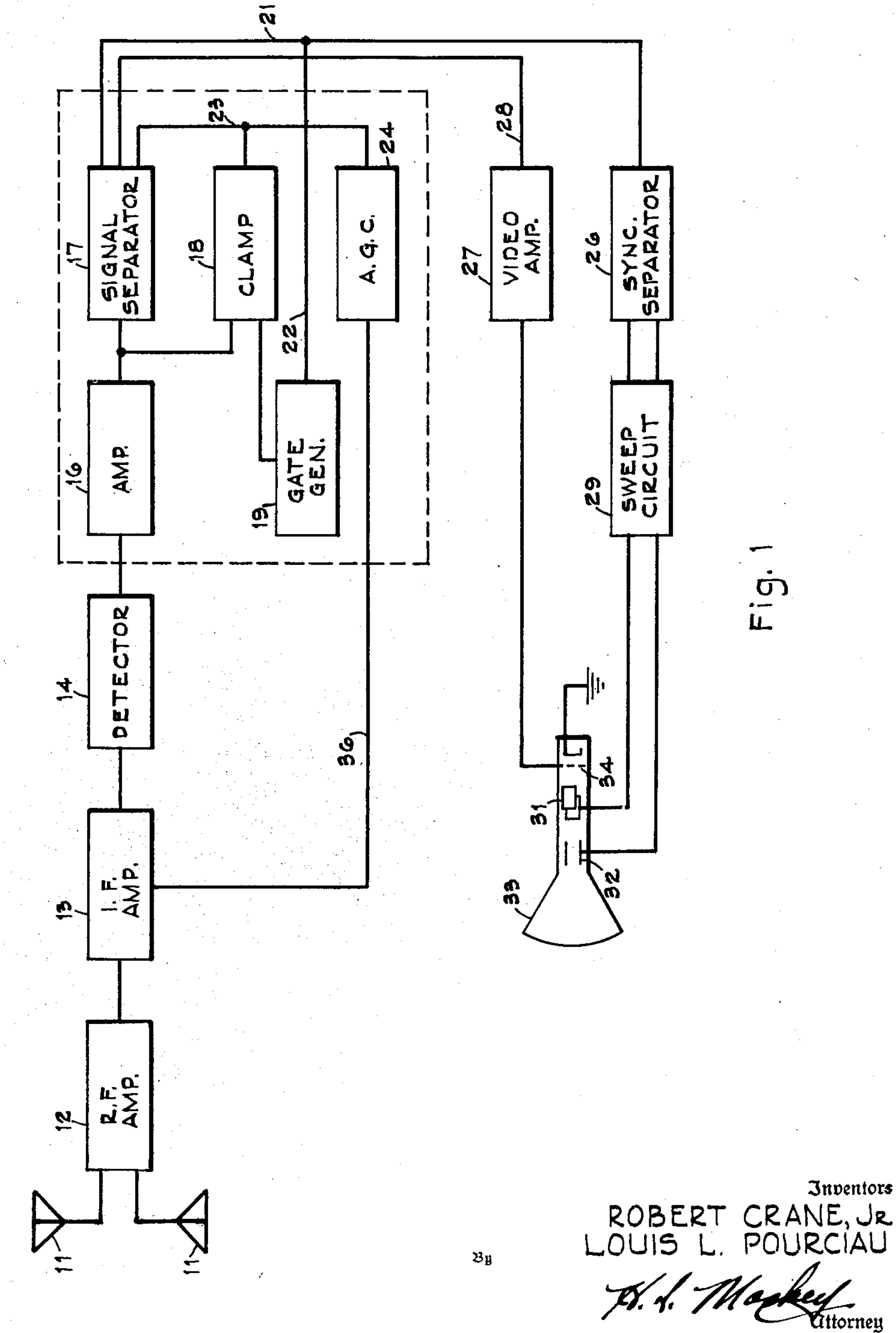
Figure 1 is a simplified block diagram of a complete television receiver incorporating the circuits to which the instant invention is particularly directed.

In Fig. 1 a complete television receiver incorporating the features of the invention is illustrated in block form with blocks illustrative of the major components of the instant invention enclosed in a dotted rectangle. By this means the manner in which the circuit of the invention cooperates with and is connected to the more conventional elements of a television receiver can be more readily ascertained.

Referring first to this simplified illustration, television signals are received by an antenna 11 and amplified by a radio frequency amplifier 12 and intermediate frequency amplifier 13 in the usual manner. The output of the intermediate frequency amplifier 13 is impressed on a second detector 14 which demodulates the intermediate frequency signal and produces a signal wave which is a composite of the picture signals and synchronizing signals as is well understood in the art.

The output of the detector 14 consisting of this composite signal is impressed on the input of an amplifier 16 by a direct current circuit in order that direct current continuity may be preserved. By this means the output of the amplifier 16 which constitutes the amplified inverted composite signal includes both alternating and direct current components and the composite signal varies with respect to a fixed reference point regardless of whether the picture signals transmitted are predominantly light or dark. That is to say, the reference axis of the composite signal is not shifted depending on the average duty cycle of the signal as would be the case if only the alternating current component of the composite signal were derived from the detector 14.

The amplified inverted composite signal output of the amplifier 16 is impressed on the input of a signal separator 17 and also on a clamp 18. The clamp 18 is intermittently operated through the medium of a gate generator 19 connected to have impressed thereon synchronizing signals derived from the signal separator 17 through conductors 21 and 22 so that the conductor 23 connected to the clamp 18, signal separator 17 and automatic gain control 24 is periodically locked and maintained at a potential determined by the black level of the received television signals.

The manner in which the clamping action takes place will be made more fully apparent hereinafter and suffice it to say for the present that the potential of the conductor 23 is periodically and intermittently brought to a potential level corresponding to the then existing black level of the composite signal and this potential level is maintained until there is a change in the black level of the signal.

This potential level is utilized as a reference potential for the signal separator 17 so that the synchronizing signals and the video signals may be clearly separated one from the other, the synchronizing signals being impressed on a synchronizing separator 26 through the conductor 21 and the picture signals being impressed on a video amplifier 27 by a conductor 28.

The synchronizing separator 26 acts in the conventional manner to separate the vertical and horizontal synchronizing pulses and these in turn operating through a sweep circuit 29 apply the appropriate potentials to the deflecting electrodes 31 and 32 of a cathode ray tube 33. At the same time the picture signals after being amplified by the video amplifier 27 are applied to a control electrode 34 controlling the instantaneous brightness of the cathode ray beam as is well understood in the art.

A fixed portion of the potential level attained and maintained at the conductor 23 is also applied to an automatic gain control circuit 24, which in turn, acting through the conductor 36, applies a potential to the gain control electrodes of the intermediate amplifier 13 such that the gain thereof is varied in accordance with the potential of conductor 23 and hence inversely in accordance with the black level of the received television signal.

Briefly then, the black level of the received signal is periodically and intermittently sampled to produce a potential dependent thereon which is maintained at its last established value until received signal conditions have changed as revealed by a subsequent sampling of the black level thereof. This potential is utilized to determine the relative gain of the amplifier stages of the receiver so that in the picture signal as applied to the cathode ray tube the potential which is representative of black in the picture signal is always exactly at a potential level representing beam-current cutoff of the cathode ray tube and the absolute gradations of the picture as presented on the viewing screen are maintained constant regardless of variations in the received signal strength or the transmitter's failure to adhere to a constant black level. Additionally the periodically established potential level constitutes a constantly rechecked potential which acting as a reference potential assists in cleanly separating the synchronizing signals from the picture signals so that each may perform its separate functions without deleterious effect produced by a portion of the other.

Figure 2:
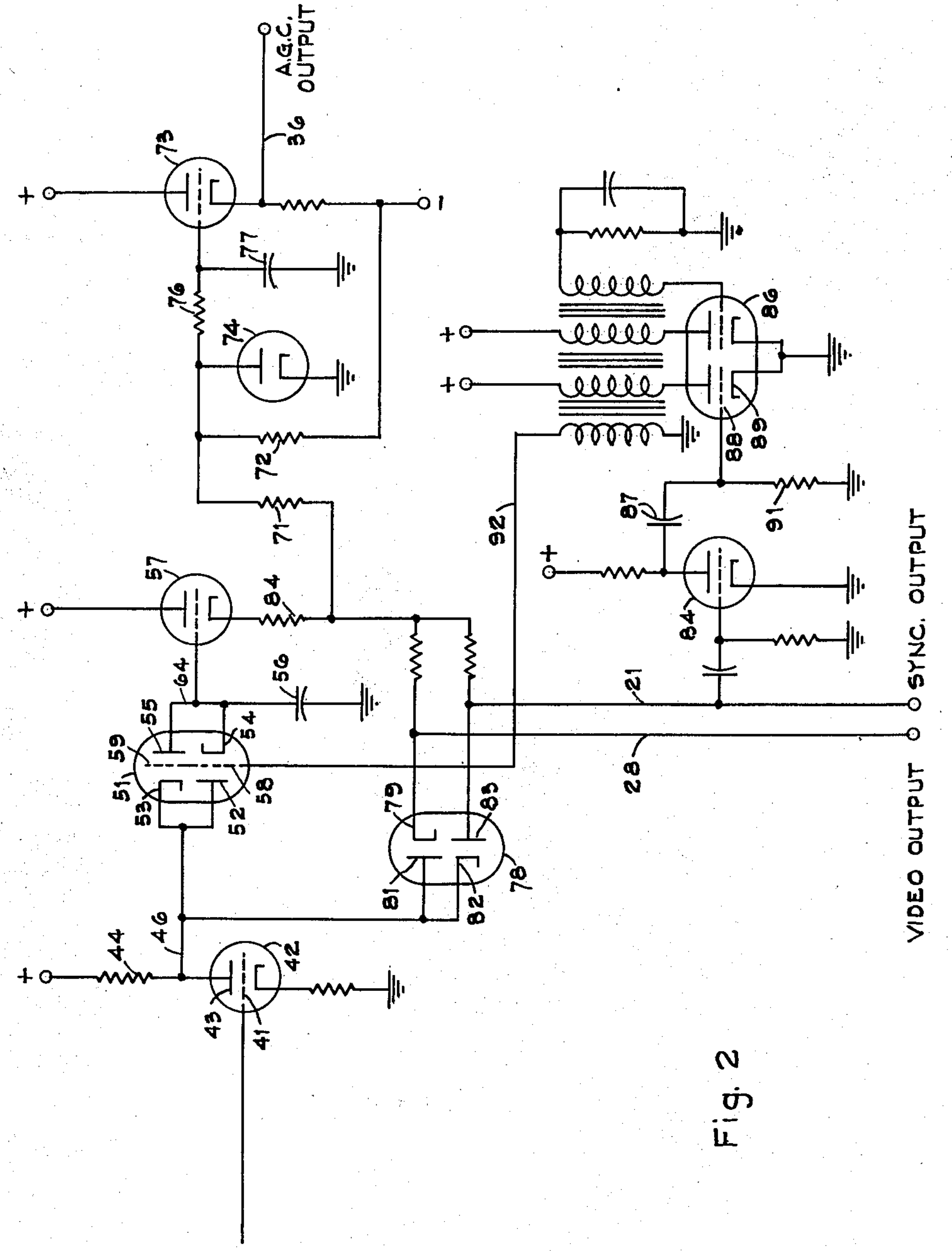
Figure 2 is a schematic diagram of as much of the receiver of Fig. 1 as is illustrative of the invention.

Turning now to Fig. 2 for a more detailed consideration of the concepts of the invention, the composite signal derived from the output of the detector is applied through a direct current connection to the control electrode 41 of a tube 42 which constitutes the amplifier 16 of Fig. 1. The anode 43 of the tube 42 being connected through a resistance 44 to a source of positive potential, the potential of the conductor 46 will have a wave form as illustrated at A of Fig. 3, namely an inverted composite picture and synchronizing signal wave. In the illustration of this wave form the horizontal scale has been purposely made inaccurate to more clearly illustrate the synchronizing pulse signals without unduly lengthening the time axis.

This wave form as is well understood in the art comprises pedestal portions 47 on which are superimposed the horizontal synchronizing pulses 48. The picture signal portions corresponding to the details of a picture image being transmitted are indicated by the irregular wave 49 occurring between the intervals established by the pedestal portions. The height of the pedestal portion 47 indicated by the dotted line *b* constitutes the black level of the transmitted signal so that the picture signals 49 vary from this level as a lower limit to a maximum corresponding to white of the receiver picture image. The horizontal synchronizing pulses 48 extend below the black level and act to synchronize the sweep circuits of the receiver.

This composite signal wave form is applied to a double triode 51 having its two halves connected in opposition, the anode 52 and cathode 53 being connected to the conductor 46 while the cathode 54 and anode 55 are connected to the condenser 56 and grid of a cathode follower 57. The double triode 51 is gated by action of the grids 58 and 59 so that either portion thereof may conduct only during that portion of the composite signal wave which is included between the dash-dot lines 61, 62 of Fig. 3 in a manner more fully explained hereinafter. The only portion of the signal which can be conducted through the tube 51, therefore, constitutes the black level "back porch" of the pedestals 47.

Figure 3:
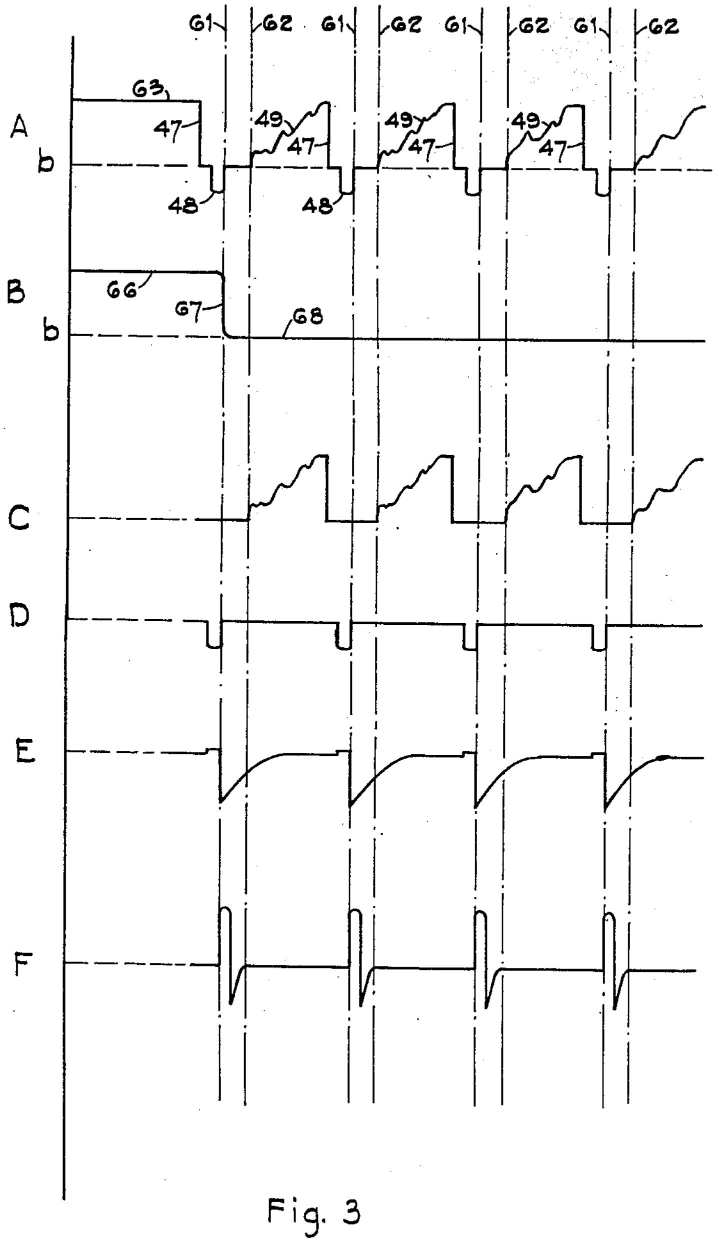
Figure 3 is a representation of the various wave forms as they appear at different points in the circuit of Fig. 2 as an aid in understanding the mode of operation of the invention.

Assume that at the time indicated by the straight vertical line at the left of Fig. 3 no signal is being received but that the signal is impressed on the circuit at a time indicated by the first pedestal 47. Under such circumstances the potential of the conductor 46 will be at the level indicated by the line 63 considerably above the black level of the composite signal until signal is received after which it follows the pedestal, synchronizing and picture levels as depicted by the wave form A.

Prior to the instant of receiving signals the tube 51 may be gated in a random fashion so that over any duration of time of no signal condition the tube 51 will be triggered to allow current to be transmitted from the anode 52 to the cathode 54, thus changing the condenser 56 and causing the conductor 64 to be brought to a potential level substantially the same as that of conductor 46. The wave form B illustrates the potential level assumed by the conductor 64 and it will be noted that prior to the time of signal imposition as indicated by the line 66 the potential level of this conductor is more positive than the black level *b* by the same amount as the conductor 46.

When signal is impressed on the system, however, the tube 51 is triggered only at those times immediately succeeding a synchronizing pulse. Immediately succeeding the reception of the first of such pulses as indicated by the wave form A of Fig. 3 the potential of conductor 46 has assumed the potential b and since current is allowed to flow through the tube 51 during the interval between the lines 61 and 62 the condenser 56 discharges through the anode 55 and cathode 53 until the potential level of the conductor 64 has dropped to that of the conductor 46, this drop being indicated by the reference numeral 67 in wave form B of Fig. 3.

After the time represented by the dash-dot line 62 the tube 51 is blocked for further current flow so that the condenser 56 can neither charge nor discharge further regardless of the fluctuations of potential of the conductor 46 and therefore the conductor 64 is retained at the previous potential as indicated by the reference numeral 68. At the time interval corresponding to the reception of the "back porch" of the next pedestal the tube 51 is again unblocked and the black level of the received signal has varied so that the potential of conductor 46 is different from that at the reception of the previous level current will flow either into or out of the condenser 56 through either the anode 52 and cathode 54 or anode 55 and cathode 53 depending on whether the new potential of the conductor 46 is higher or lower than the previous potential.

Thus at recurrent time intervals the conductor 64 is fixed at a potential directly dependent on the black level potential of the signal as last received. This periodically rechecked potential is applied to the grid of a cathode follower 57 which aids in isolating the condenser 56 so that its charge will not change during the nonconducting periods of the tube 51 and an equivalent potential obtained from the cathode by the usual cathode follower action is applied through a voltage dividing network consisting of resistors 71 and 72 to the grid of a cathode follower 73. The output of the cathode follower 73 is obtained from the conductor 36 connected to the cathode in the usual manner and the potential of this latter conductor constitutes the automatic gain control potential which is applied to the control electrodes of the amplifier stages of the receiver as indicated in Fig. 1.

Thus at a lower level the potential of the conductor 36 has a filtered wave form filtered by the condenser 76 and resistor 77 but otherwise similar to that of the wave form B of Fig. 3 and the gain of the amplifier is always related to the black level potential of the received signal. If, for example, the black level of the signal impressed on the antenna should vary so that the black level of the signal as impressed on the cathode ray tube tends to depart from the voltage level set for the black of the picture image, the gain of the amplifier stages will be automatically varied in a compensatory direction.

Thus the signal level at the output is maintained constant utilizing the black level as the datum of reference for all other signal levels.

A diode 74 is connected between the grid of the cathode follower 73 and ground to prevent the grid from becoming positive under very low signal conditions so that a positive potential may not be impressed on the gain control electrodes of the amplifier 13 (Fig. 1) under any possible conditions. Additionally a resistor 76 and condenser 77 are connected to the input of the cathode follower 73 and are adjusted to have a time constant for as rapid variation of gain control potential output to the conductor 36 consistent with stability of the amplifier 13.

In addition to producing the potential for automatic gain control through operation of the potential divider 71, 72 and cathode follower 73, the output potential derived from the cathode follower 57 is impressed on a duo-diode 78 constituting a means for separating the synchronizing signals and the video signals. The cathode 79 of the duo-diode 78 is connected to the cathode circuit of the cathode follower 57 while its cooperating anode 81 is connected to the conductor 46. On the other hand the cathode 82 is connected to the conductor 46 and its cooperating anode is connected to the cathode circuit of the cathode follower 57. For correct operation the cathode 79 and anode 83 should be maintained at the exact level of the voltage of conductor 46 when the black level of the received signal is imposed thereon, and since the cathode follower 57 is not theoretically perfect in operation the slight discrepancy which would otherwise occur is compensated for by the introduction of a resistor 84 connected between the cathode of the cathode follower 57 and the cathode 79 and anode 83. Thus, the cathode 79 and anode 83 are placed at a reference potential equal to the potential of the black level of the signal impressed on conductor 46, whatever that may be. When the potential of the conductor 46 is above this level current will flow from the anode 81 to the cathode 79 and may be derived from the diode 78 by the conductor 28. On the other hand, when the potential of conductor 46 is below the reference level current flows from the anode 83 to the cathode 82 and is derived from the diode 78 by the conductor 21. Inasmuch as all potentials which are above the black level constitute picture signals and blanking pedestals while all potentials below this level constitute synchronizing signals clean separation of picture signals is had from the synchronizing signals, the former exemplified by waveform C of Fig. 3 being imposed on conductor 28 and the latter exemplified by waveform D of Fig. 3 being imposed on conductor 21.

Likewise since the reference level potential is continuously checked and locked to the level of potential attained by conductor 46 at the time of occurrence of the "back porch" of the last pedestal, any variation in signal level or variation of the transmitter from a constant black level will automatically shift the level of operation of the signal separator 78 to at all times ensure accurate separation of picture signals and synchronizing signals.

The synchronizing signals so separated, besides being imposed on the synchronizing separator 26 of Fig. 1 to operate the sweep generator 29 are also applied to the grid of a trigger generator 84 which, together with the blocking oscillator 86, constitutes the gate generator 19 of Fig. 1.

When the negative pulses corresponding to the synchronizing signals D of Fig. 3 are applied to the grid of the trigger generator 84 its anode is momentarily made more positive and this variation in a positive direction acting through the condenser 87 connected between the anode of 84 and the grid 88 of the blocking oscillator 86 tends to impress a positive potential on the grid 88. Inasmuch as the cathode 89 of the blocking oscillator is grounded and the grid 88 is connected to ground through the resistor 91, any tendency for the grid to become positive causes grid current to flow and this current flow charges the condenser 87. This action occurs during the time of application of the synchronizing pulse to the grid of the tube 84 and immediately after this pulse has ceased to be applied the anode side of condenser 87 returns to its former lower potential and the grid side of the condenser 87 and consequently the grid 88 is driven negatively, normal ground potential at the grid 88 being resumed only after a time depending on the time constant of the resistor 91 and condenser 87.

The potential of the grid 88, therefore, fluctuates in the manner illustrated by the waveform E of Fig. 3 becoming sharply negative immediately succeeding the cessation of a particular synchronizing signal. This sharp negative impulse triggers the blocking oscillator 86 in the well known manner causing an output waveform as indicated at F of Fig. 3 to be applied to the conductor 92, and hence the grids 58 and 59 of the double triode 51. The double triode, therefore, is unblocked only during the short interval of time immediately succeeding the cessation of a synchronizing signal, which time interval coincides with the time of occurrence of the "back porch" of a blanking pedestal.

Thus both the potential required for automatic gain control and the potential for separating the positive signals from the synchronizing signals is made dependent on the black level potential at the output of the second detector and by successively sampling this potential at each occurrence thereof following each horizontal line scan, the black level signal at the viewing screen is maintained substantially constant even though the black level of the transmitted signal should vary for one reason or another during the course of signal transmission. Such an arrangement, then, makes frequent readjustments of brightness and contrast unnecessary.

In the particular embodiment of the invention described herein simplification and clarity has been had by illustrating only triodes and diodes for the various tube components and by eliminating any illustration of heater elements. Those skilled in the art will recognize, however, that multiple element tubes may be employed where desired.

What is claimed is:

1. In a television receiver wherein received television signals are demodulated to produce a composite signal wave of mixed picture signals and blanking pedestals on which synchronizing signals are superimposed, a condenser, means for impressing said signal wave on said condenser having one side connected to a terminal of reference potential during the intervals of occurrence of those portions of the blanking signals which immediately succeed said synchronizing signals and for preventing energy transfer between said condenser and the circuit carrying said composite signal during all other periods, whereby a direct current potential is developed across said condenser having the same at the magnitude as the potential level of said blanking pedestals, a cathode follower, means impressing the potential developed across said condenser on its input, an output circuit for said cathode follower including a voltage dividing network adjusted to produce a potential substantially equal to the blanking pedestal potential, a first circuit interconnecting said circuit carrying said composite signal and said cathode follower output circuit including a first tube section having its anode connected to the circuit carrying said composite signal and its cathode connected to said cathode follower output circuit, a circuit connected to said cathode for deriving only picture signals and blanking pedestal from said first circuit, a second circuit interconnecting said circuit carrying said composite signal and said cathode follower output circuit including a second tube section having its cathode connected to said circuit carrying said composite signal and its anode connected to said cathode follower output circuit, means for limiting the current flow through said first and second tube sections to a small fraction of the current flow through said cathode follower and a circuit connected to the anode of said second tube section for deriving only synchronizing signals from said second circuit.

2. A television receiver in accordance with claim 1 having means for deriving a gain control potential from said cathode follower output circuit and a circuit for impressing said gain control potential on selected amplifier stages of said television receiver.

3. In a television receiver wherein received television signals are demodulated to produce a composite wave of mixed picture signals and blanking pedestals on which synchronizing signals are superimposed, a circuit on which said composite signal wave is impressed, a condenser having one side connected to a terminal of reference potential, a normally nonconductive gating means interposed between the circuit carrying said composite signal wave and said condenser for preventing interchange of energy between said circuit and said condenser, trigger means operative by the termination of said synchronzing signals momentarily rendering said gating means conductive whereby said condenser is placed at a potential substantially equal to the amplitude of said blanking pedestals, a cathode follower connected to have said condenser potential impressed on its input and having an output circuit a voltage dividing network adjusted to produce a potential substantially equal to the blanking pedestal potential, a first circuit interconnecting the circuit carrying said composite signal wave and said cathode follower output circuit including a first tube section having its anode connected to the circuit carrying said composite signal wave and its cathode connected to said cathode follower output circuit, a circuit connected to said cathode for deriving only picture signals and blanking pedestals from said first circuit, a second circuit interconnecting the circuit carrying said composite signal wave and said cathode follower output including a second tube section having its cathode connected to the circuit carrying said composite signal wave and its anode connected to said cathode follower output circuit, means for limiting the current flow through said first and second tube sections to a small fraction of the current flow through said cathode follower and a circuit connected to the anode of said second tube section for deriving only synchronizing signals from said second circuit.

4. A television receiver in accordance with claim 3 having means for deriving a gain control potential from said cathode follower output circuit and a circuit for impressing said gain control potential on selected amplifier stages of said television receiver.

5. In a television receiver, a demodulator producing a composite signal wave of mixed picture signals and blanking pedestals on which synchronizing signals are superimposed, an amplifier, a direct connection between the output of said demodulator and the input of said amplifier, a direct current output circuit for said amplifier, a condenser having one side connected to a terminal of reference potential, means for impressing the composite signal wave developed in the output circuit of said amplifier during the intervals of occurrence of those portions of the blanking pedestals which immediately succeed said synchronizing signals and for preventing energy transfer between said condenser and the output circuit of said amplifier at all other periods, whereby a direct current potential is developed across said condenser which is substantially the magnitude of the potential level of said blanking pedestals, a cathode follower connected to have said condenser potential impressed on its input and having an output circuit including a voltage dividing network adjusted to produce a potential equal to the blanking pedestal level, a first circuit interconnecting said amplifier output circuit and said cathode follower output circuit including a first tube section having its anode connected to said amplifier output circuit and its cathode to said cathode follower output circuit, a circuit connected to said cathode for deriving only picture signals and blanking pedestals from said first circuit, a second circuit interconnecting said amplifier output circuit and said cathode follower output circuit including a second tube section having its cathode connected to said amplifier output circuit and its anode connected to said cathode follower output circuit, means for limiting the current flow through said first and second tube sections to a small fraction of the current flow through said cathode follower and a circuit connected to the anode of said second tube section for deriving only synchronizing signals from said second circuit.

6. A television receiver in accordance with claim 5 having means for deriving a gain control potential from said cathode follower output circuit and a circuit for impressing said gain control potential on selected amplifier stages of said television receiver.

7. In a television receiver, a demodulator producing a composite signal wave of mixed picture signals and blanking pedestals on which synchronizing signals are superimposed, an amplifier, a direct current connection between the output of said modulator and the input of said amplifier, a direct current output circuit for said amplifier, a condenser having one side connected to a terminal of reference potential, a normally nonconductive gating means interposed between said amplifier output circuit and said condenser preventing interchange of energy therebetween, trigger means operative by the termination of said synchronizing signals for momentarily rendering said gating means conductive whereby said condenser is caused to assume a potential substantially equal to the potential level of the blanking pedestals, a cathode follower connected to have the potential of said condenser impressed on its input and having an output circuit including a voltage dividing network adjusted to produce a potential equal to the blanking pedestal level, a first circuit interconnecting said amplifier output circuit and said cathode follower output circuit including a first tube section having its anode connected to said amplifier output circuit and its cathode to said cathode follower output circuit, a circuit connected to said cathode for deriving only picture signals and blanking pedestals from said first circuit, a second circuit interconnecting said amplifier output circuit and said cathode follower output circuit including a second tube section having its cathode connected to said amplifier output circuit and its anode connected to said cathode follower output circuit, means for limiting the current flow through said first and second tube sections to a small fraction of the current flow through said cathode follower and a circuit connected to the anode of said second tube section for deriving only synchronizing signals from said second circuit.

8. A television receiver in accordance with claim 7 having means for deriving a gain control potential from said cathode follower output circuit and a circuit for impressing said gain control potential on selected amplifier stages of said television receiver.

9. In a television receiver, a demodulator producing a composite signal wave of mixed picture signals and blanking pedestals on which synchronizing signals are superimposed, an amplifier, a direct current connection between the output of said demodulator and the input of said amplifier, a condenser having one side connected to a terminal of reference potential, a first circuit interconnecting said amplifier output and said condenser comprising a first tube section having its anode connected to said amplifier output and its cathode connected to said condenser, a second circuit interconnecting said amplifier output and said condenser comprising a second tube section having its cathode connected to said amplifier output and its anode connected to said condenser, control electrodes for each of said first and second tube sections at potentials normally rendering said tube sections nonconductive, means connected to said control electrodes and operable in accordance with said synchronizing signals for rendering said first and second tube sections momentarily conductive only during those intervals which immediately succeed said synchronizing signals whereby energy is transferred between said amplifier output and said condenser only during those intervals producing a potential drop across said condenser which is substantially that of the potential level of said blanking pedestals, a cathode follower connected to have the potential of said condenser impressed on its input and having an output circuit including a voltage dividing network adjusted to produce a potental substantially equal to the blanking pedestal level, a third circuit interconnecting said amplifier output circuit and said cathode follower output circuit including a third tube section having its anode connected to said amplifier output circuit and its cathode to said cathode follower output circuit, a circuit for deriving only picture signals and blanking pedestals from said third circuit, a fourth circuit interconnecting said amplifier output circuit and said cathode follower output circuit including a fourth tube section having its cathode connected to said amplifier output circuit and its anode connected to said cathode follower output circuit, means for limiting the current flow through said third and fourth tube sections to a small fraction of the current flow through said cathode follower and a circuit connected to the anode of said fourth tube section for deriving only synchronizing signals from said fourth circuit.

10. A television receiver in accordance with claim 9 having means for deriving a gain control potential from said cathode follower output circuit and a circuit for impressing said gain control potential on selected amplifier stages of said television receiver.

11. In a television receiver, a demoluator producing a composite signal wave of mixed picture signals and blanking pedestals on which synchronizing signals are superimposed, an amplifier, a direct current connection between the output of said demodulator and the input of said amplifier, a condenser having one side connected to a terminal of reference potential, a first circuit interconnecting said amplifier output and said condenser comprising a first tube section having its anode connected to said amplifier output and its cathode connected to said condenser, a second circuit interconnecting said amplifier output and said condenser comprising a second tube section having its cathode connected to said amplifier output and its anode to said condenser, control electrodes for each of said first and second tube sections at potentials normally rendering said tube sections nonconductive, a trigger generator operated by said synchronizing signals producing a signal pulse immediately succeeding the occurrence of said synchronizing signals, means connected to said control electrodes and operative by said pulse signals for rendering said first and second tube sections momentarily conductive whereby energy is transferred between said amplifier output and said condenser only during said momentary intervals producing a potential drop across said condenser which is substantially that of the potential level of said blanking pedestals, a cathode follower connected to have the potential drop existing across said condenser impressed on its input and having an output circuit including a voltage dividing network adjusted to produce a potential equal to the blanking pedestal level, a third circuit interconnecting said amplifier output circuit and said cathode follower output circuit including a third tube section having its anode connected to said amplifier output circuit and its cathode to said cathode follower output circuit, a circuit for deriving only picture signals and blanking pedestals from said third circuit, a fourth circuit interconnecting said amplifier output circuit and said cathode follower output circuit including a fourth tube section having its cathode connected to said amplifier output circuit and its anode connected to said cathode follower output circuit, means for limiting the current flow through said third and fourth tube sections to a small fraction of the current flow through said cathode follower and a circuit connected to the anode of said fourth tube section for deriving only synchronizing signals from said fourth circuit.

12. A television receiver in accordance with claim 11 having means for deriving a gain control potential from said cathode follower output circuit and a circuit for impressing said gain control potential on selected amplifier stages of said television receiver.

13. In a television receiver, a demodulator producing a composite signal wave of mixed picture signals and blanking pedestals on which synchronizing signals are superimposed, an amplifier, a direct current connection between the output of said demodulator and the input of said amplifier, a condenser, a first circuit interconnecting said amplifier output and said condenser comprising a first tube section having its anode connected to said amplifier output and its cathode connected to said condenser, a second circuit interconnecting said amplifier output and said condenser comprising a second tube section having its cathode connected to said amplifier output and its anode to said condenser, control electrodes for each of said first and second tube sections at potentials normally rendering said tube sections nonconductive, a trigger generator producing pulse signals, means connected to said control electrodes and operative by said pulse signals for momentarily rendering said first and second tube sections conductive whereby energy is transferred between said amplifier output and said condenser only during said conductive intervals and the potential drop produced across said condenser is made to correspond to the potential of the amplifier output circuit at the time said tube sections are rendered conductive, a cathode follower connected to have the potential drop existing across said condenser impressed on its input and having its output adjusted to produce a potential equal to the potential level assumed by said amplifier output circuit during the intervals of conductivity of said first and second tube sections, a third circuit interconnecting said amplifier output circuit and said cathode follower output circuit including a third tube section having its anode connected to said amplifier output circuit and its cathode to said cathode follower output circuit, a circuit for deriving only picture signals and blanking pedestals from said third circuit, a forth circuit interconnecting said amplifier output circuit and said cathode follower output circuit including a fourth tube section having its cathode connected to said amplifier output circuit and its anode connected to said cathode follower output circuit, means for limiting the current through said third and fourth tube sections to a small fraction of the current flow through said cathode follower, a circuit connected to the anode of said fourth tube section for deriving only synchronizing signals from said fourth circuit and circuit means for applying the synchronizing signal derived by said last-mentioned circuit to said trigger generator whereby the pulse signals produced by said trigger generator occurs in timed relation to and immediately succeeds said synchronizing signals.

14. A television received in accordance with claim 13 having means for deriving a gain control potential from said cathode follower output circuit and a circuit for impressing said gain control potential on selected amplifier stages of said television receiver.

ROBERT CRANE, Jr.
LOUIS L. POURCIAU.

REFERENCES CITED

The following references are of record in the file of this patent:

UNITED STATES PATENTS

| Number | Name | Date |
|---|---|---|
| 2,227,056 | Blumlein | Dec. 31, 1940 |
| 2,240,600 | Applegarth | May 6, 1941 |
| 2,300,942 | Lewis | Nov. 3, 1942 |
| 2,303,909 | Blumlein | Dec. 1, 1942 |
| 2,307,375 | Blumlein et al. | Jan. 15, 1943 |
| 2,467,486 | Krumhansl et al. | Apr. 19, 1949 |

OTHER REFERENCES

Wendt, Television DC Component, RCA Review, Mar. 1948, vol. IX, pages 106 and 109.

Automatic Gain Controls for Television Receivers, Wendt and Schroeder, RCA Review, Sept. 1948, vol. IX #3, pages 386–388.